United States Patent [19]

Itzinger et al.

[11] 4,375,843

[45] Mar. 8, 1983

[54] PISTON-CYLINDER ASSEMBLY FOR A VIBRATION DAMPER UNIT HAVING AN ESSENTIALLY TUBULAR CONTAINER

[75] Inventors: Hermann Itzinger, Dittelbrunn; Manfred Koller, Euerbach-Obbach; Erich Jäger, Schweinfurt; Werner Christel, Hambach, all of Fed. Rep. of Germany

[73] Assignee: Fichtel & Sachs AG, Schweinfurt, Fed. Rep. of Germany

[21] Appl. No.: 207,981

[22] Filed: Nov. 18, 1980

[30] Foreign Application Priority Data

Dec. 1, 1979 [DE] Fed. Rep. of Germany ....... 2948391

[51] Int. Cl.³ .......................... B21D 17/04; F16F 9/32
[52] U.S. Cl. ................................. 188/322.19; 29/446; 29/455 R; 277/1
[58] Field of Search ...................... 188/322.19, 322.21, 188/322.22, 322.12, 322.16–322.18, 322.11, 315, 317–318, 322.15, 322.14; 29/446, 455 R; 277/1, 237 R; 92/169–171; 267/64.15, 64.26

[56] References Cited

U.S. PATENT DOCUMENTS

| 3,242,558 | 3/1966 | Selig | 29/455 R X |
| 3,907,080 | 9/1975 | Chadwick | 188/322.12 |
| 3,967,363 | 7/1976 | Meyer | 29/455 R X |
| 4,167,991 | 9/1979 | Karklins et al. | 188/322.12 |
| 4,207,661 | 6/1980 | Mase et al. | 29/455 R X |
| 4,270,635 | 6/1981 | Wössner | 188/322.17 |

FOREIGN PATENT DOCUMENTS 2757232 7/1978 Fed. Rep. of Germany ...................... 188/322.19

Primary Examiner—Douglas C. Butler
Attorney, Agent, or Firm—Toren, McGeady and Stanger

[57] ABSTRACT

A piston-cylinder unit for shock absorbers or the like is formed with a tubular container surrounding the cylinder and with a piston rod guide and sealing unit mounted at one end of the container with a support for the cylinder at the other end of the container. In order to effect a satisfactory sealing action at the fixing points of the cylinder, the cylinder is formed with a radial indentation.

18 Claims, 1 Drawing Figure

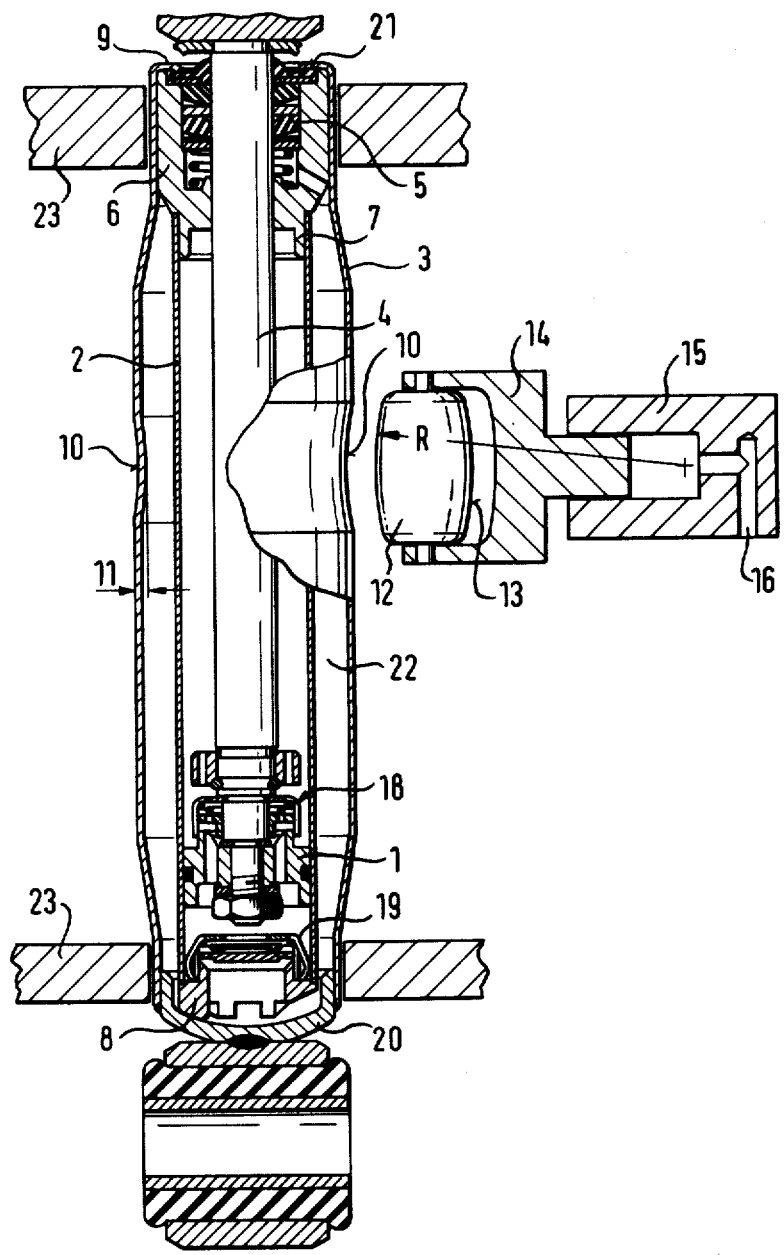

PISTON-CYLINDER ASSEMBLY FOR A VIBRATION DAMPER UNIT HAVING AN ESSENTIALLY TUBULAR CONTAINER

The invention relates generally to vibration dampers or the like, and more particularly to a piston-cylinder unit formed to include an essentially tubular container at whose end a piston rod of the piston-cylinder unit is sealed toward the interior and wherein a piston rod guide is fastened by deforming the container end.

Units of this type are known particularly as double-tube vibration dampers wherein a cylinder of the unit is arranged within a container which is fixed between the piston rod guide and a bottom member of the unit. These units are closed by rolling together the container end, so that the flanged end is pressed in the axial direction against the piston rod guide. In order to obtain a satisfactory, tight composite action between the cylinder and the piston rod guide, or between the cylinder and the bottom member, it is necessary to apply an initial stressing force acting between these parts. If this initial stressing force is not sufficiently strong, flow channels may be formed which facilitate undesired flow of damping liquid from the work chambers into the compensation chamber and which thus impair the damping action of the vibration damper.

In vibration dampers involving high damping forces, it is known to insert a sealing ring each between the cylinder and the piston rod guide and between the cylinder and the bottom member. Such sealing rings may consist, for example, of soft iron. However, this expedient also fails to ensure a satisfactory sealing action because of the great forces which occur. On the other hand, the initial stressing force required for the sealing action between the piston rod guide and the cylinder, as well as between the bottom member and the cylinder cannot be applied by the unlimited use of axial pressure during rolling because this leads to the danger that components may be destroyed or damaged.

Accordingly, the present invention is directed toward provision of a simple manner for applying an initial stressing force between cylinder and piston rod guide and between cylinder and bottom member in already closed piston-cylinder units or to provision of a manner for increasing an already existing initial stressing force.

SUMMARY OF THE INVENTION

Briefly, the present invention may be described as a piston-cylinder unit, particularly useful for shock absorbers and telescopic struts, comprising an essentially tubular container with a first axial end region and a second axial end region, a cylinder arranged within said container with a first axial end region facing toward said first axial end region of said container, and a second axial end region facing said second axial end region of said container, support means on said container at said first axial end region thereof for axial support of said first axial end region of said cylinder, a piston rod guide and sealing unit arranged, at least in part, within said second axial end region of said container and supported in the axial direction on said second axial end region of said cylinder, a deformation in said second axial end region of said container by means of which said piston rod guide and sealing unit is fixed in the axial direction relative to said container so that said cylinder is fixed axially immovably between said support means and said piston rod guide and sealing unit, a piston rod inserted into said cylinder through said piston rod guide and sealing unit, and a piston connected to said piston rod within said cylinder. The invention is particularly characterized by the formation of at least one circumferential indentation in the container between the support means and the deformation, said indentation being made after the deformation has been made.

In accordance with the invention, the indentation in the container is formed by at least one roller which is curved in the shape of a drum. The resulting axial contraction of the container prestresses the damper in the desired manner, while the indentation itself is produced by a very simple tool. If, in accordance with another feature of the invention, the roller axes are arranged parallel to the cylinder axis, an indentation is obtained which is closed in itself, i.e., which extends without pitch on the outer wall of the container.

The roller proper is a very simple tool because it has an outer surface which extends in the longitudinal section of the plane of the axis and is essentially formed by a circular arc with a large radius. The surface of this roller is generally smooth. However, when the roller is driven, it is advantageous, in accordance with another feature of the invention, to construct the running surface of the roller so as to be corrugated.

In accordance with another feature of the invention, the contact pressure of the roller is controlled so as to be approximately proportional to the desired initial stressing force between the piston rod guide and the cylinder. Accordingly, the necessary initial stressing force is achieved in a simple manner, with a deforming time as short as possible being desired.

In a further feature of the invention, the rollers have an elastic support with respect to the feed motion. In this manner, a noncircular shape of the container is absorbed by the rollers, so that the formation of folds in the cylindrical portion of the container is safely avoided in the production of indentations.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWING

The single FIGURE of drawing is a sectional view showing double-tube vibration damper for motor vehicles with a circular indentation which is closed in itself, together with the tool for making this indentation.

DETAILED DESCRIPTION OF THE PREFERRED EMBODIMENT

The illustrated double-tube vibration damper for motor vehicles in accordance with the invention has a piston 1 which is rigidly connected to the piston rod 4, with the piston 1 sliding on the internal surface of a cylinder 2 provided with bottom damping valves 19. The piston rod 4 is guided and sealed toward the interior of the vibration damper by means of a piston rod guide and sealing unit 5, 6. The piston rod guide and sealing unit 5, 6 has a projection 7 which is adjusted to the internal diameter of the cylinder 2 and which serves for receiving and centering the cylinder 2.

The other end of the cylinder 2 has a bottom part 8 which simultaneously receives the bottom valve 19 of the vibration damper and which is also provided with a projection for centering the cylinder 2 in a bottom 20 of a container 3. In this embodiment, the container bottom 20 is welded to the container 3.

For closing off the shock absorber, the upper end of the container 3 is flanged by rolling it over the end face 21 of the piston rod guide and sealing unit. Accordingly, in the formation of the flange 9, an axial pressure is applied on the vibration damper housing, wherein the piston rod guide and sealing unit 5, 6 applies an axial force over the cylinder 2 and the bottom part 8 on the bottom 20 of the container 3. If the axial stress of the cylinder 2 is not sufficient, flow channels are formed between the projection 7 of the piston rod guide and sealing unit 5, 6 and the cylinder 2, and between the centering of the bottom part 8 and the cylinder 2. The existence of such flow channels could lead to an unwanted flow of damping liquid from the work chambers in the cylinder 2 into a compensation chamber 22 between the cylinder 2 and the container 3, thereby impairing the damping action of the vibration damper.

For increasing the initial stressing force between cylinder 2 and piston rod guide 6 and between cylinder 2 and bottom part 8, an indentation 10 is made in the container 3 by means of a roller 12. This roller 12 is guided in a roller bearing 14 and is pressed against the container 3 by a force which acts radially on the container axis. The contact pressure of the roller 12 is chosen so that it is approximately proportional to the desired initial stressing force. In this connection, it must be ensured that the deforming time is as short as possible in order to avoid deformation of the material beyond the yield point. The indentation 10 has a relatively large axial length, while the indentation depth 11 is kept small. The outer contour 13 of the roller 12 is slightly curved and is formed, for example, by a circular arc having a radius R of 200 mm. The transition from this outer contour to the end faces of the roller 12 is effected by a radius of smaller diameter. In a preferred embodiment, the radius R is at least 1.5 times the axial length of the indentation 10.

The relatively long axial length of the circumferential indentation 10 which is closed in itself leads to a shortening of the container 3 and, thus, to a corresponding initial stress between cylinder 2 and the piston rod guide and sealing unit 5, 6 and the bottom part 8. Accordingly, the end faces of the cylinder 2 are brought together and tightly pressed against the corresponding counter surfaces of the piston rod guide and sealing unit 5, 6 and the bottom part 8, so that unwanted flow channels which may possibly exist are closed. For the sake of simplicity, only one roller 12 is illustrated in the drawing. Advantageously, a plurality of tools of this kind may be arranged distributed over the circumference. For achieving the initial stress, no forces are required which act in the axial direction of the piston cylinder unit. The cylinder will be placed under a compressive stress and the container will undergo tensile stress.

Although the illustrated roller 12 has a smooth surface, the roller 12 can also be provied with a corrugated surface so that the slip between roller 12 and the surface of the container 3 is reduced. It is insignificant in the production of the indentation whether the roller 12 or the container 3 is the driven member in effecting the relative rotation motion.

In the illustrated embodiment, the roller bearing 12 is simultaneously constructed as a piston of a hydraulic unit. The hydraulic fluid is supplied or discharged through a supply duct 16 of a hydraulic cylinder 15. It is advantageous during such hydraulically-actuated motion that the hydraulics effect a certain elastic support function of the rollers to therefore provide that noncircular shapes of the container 3 are absorbed in the region of the indentation 10 without the formation of folds.

The axial length of the rollers 12 or of the indentation 10 is not limited to the embodiment illustrated in the drawing, but can be substantially extended. The depth 11 of indentation is usually a few tenths of a millimeter up to about 1 mm.

In another form of the illustrated embodiment, it is easily conceivable to make the indentation 10 of the container 3 helical, wherein the indentation is at least one full pitch or a multiple thereof. Contrary to the illustrated embodiment in which the axis of the roller 12 extends parallel to the axis of the container 3, the roller axis may be inclined relative to the container axis. The indentation can also easily extend over the entire length of the cylindrical portion of the container 3 which is not fixed. This is achieved by means of a roller having an appropriately large axial length.

For making the indentation 10, the roller bearing 12 is advantageously pressed with an adjusted force against the container 3 through the supply of hydraulic medium into the hydraulic cylinder 15, and it is retracted after a certain time. The travel distance of the roller bearing 14 is not limited.

In the drawing, support members 23 serve to indicate how the piston-cylinder unit is fixed at its ends while the roller 12 acts on the container 3. Of course, other forms of fixing are also possible. For example, it is conceivable that the piston-cylinder unit may be simply arranged with a plurality of rollers distributed over the circumference acting simultaneously.

The indentation does not necessarily have to be effected through mechanical deformation. It is also conceivable to effect the indentation in accordance with known electromagnetic deformation methods.

The drawing indicates that the generatrix of the outer surface of the roller 13 is a circular arc with a radius R, wherein this radius corresponds approximately to twice the axial length of the indentation 10. The axial length of the indentation 10 is at least 5 percent, and preferably at least 10 percent, of the axial distance between the bottom 20 and the flange 9. Expressed in absolute dimensions, the axial length of the indentation is at least 25 mm.

While a specific embodiment of the invention has been shown and described in detail to illustrate the application of the inventive principles, it will be understood that the invention may be embodied otherwise without departing from such principles.

What is claimed is:

1. A piston-cylinder unit, particularly useful for shock absorbers and telescopic struts, comprising
   (a) an essentially tubular container with a first axial end region and a second axial end region;
   (b) a cylinder arranged within said container, with a first axial end region facing toward said first axial end region of said container, and a second axial end region facing said second axial end region of said container;

(c) support means on said container at said first axial end region thereof for axial support of said first axial end region of said cylinder;

(d) a piston rod guide and sealing unit arranged at least in part within said second axial end region of said container and supported in the axial direction on said second axial end region of said cylinder;

(e) a deformation in said second axial end region of said container by means of which said piston rod guide and sealing unit is fixed in the axial direction relative to said container, so that said cylinder is fixed axially immovably between said support means and said piston rod guide and sealing unit;

(f) a piston rod inserted into said cylinder through said piston rod guide and sealing unit;

(g) a piston connected to said piston rod within said cylinder; and (h) at least one circumferential indentation in said container between said support means and said deformation which is made after said deformation has been made.

2. A piston-cylinder unit according to claim 1 wherein said indentation has an axial length of at least 5% of the axial distance between said support means and said deformation.

3. A piston-cylinder unit according to claim 1 wherein said indentation has an axial length of at least 10% of the axial distance between said support means and said deformation.

4. A piston-cylinder unit according to claims 1, 2, or 3 wherein said indentation has an axial length of at least 25 mm.

5. A piston-cylinder unit according to claims 1, 2, or 3, wherein the radial depth of said indentation is in the order of magnitude of between 0.2 mm to about 1 mm.

6. A piston-cylinder unit according to claim 1 wherein transitional portions between said indentation and the regions of said container adjacent thereto are devoid of sharp edges.

7. A piston-cylinder unit according to claim 1 wherein said cylinder is under an initial compressive stress between said support means and said piston rod guide and sealing unit, and wherein said container is under tensile stress between said support means and said deformation.

8. A piston-cylinder unit according to claim 1 wherein said support means are formed by a bottom of said container.

9. A piston-cylinder unit according to claim 1 wherein said piston rod guide and sealing unit bears essentially tightly against said second end region of said cylinder.

10. A piston-cylinder unit according to claim 1 wherein the interior of said cylinder is in its first end region in communication through throttled outlet means with an annular chamber formed between said container and said cylinder.

11. A piston-cylinder unit according to claim 1 wherein said piston defines two work chambers within said cylinder which are in communication with each other through throttled connecting means.

12. A piston-cylinder unit according to claim 1 wherein said deformation in said second end region of said container is constructed as radially directed flange which bears against an essentially axially directed surface of said piston rod guide and sealing unit.

13. A method for producing a piston-cylinder unit which is structured to include:

(a) an essentially tubular container with a first axial end region and a second axial end region;

(b) a cylinder arranged within said container with a first axial end region of said cylinder facing toward said first axial end region of said container, and a second axial end region of said cylinder facing said second axial end region of said container;

(c) support means of said container at said first axial end region thereof for axial support of said first axial end region of said cylinder;

(d) a piston rod guide and sealing unit arranged at least in part within said second axial end region of said container and supported in the axial direction on said second axial end region of said cylinder;

(e) a deformation in said second axial end region of said container by means of which said piston rod guide and sealing unit is fixed in the axial direction relative to said container so that said cylinder is fixed axially immovably between said support means and said piston rod guide and sealing unit;

(f) a piston rod inserted into said cylinder through said piston rod guide and sealing unit; and (g) a piston connected to said piston rod within said cylinder;

said method comprising the steps of inserting said cylinder into said container until said first end region of said cylinder is almost against said support means whereupon said piston rod guide and sealing unit is inserted to said second end region of said container until it bears almost against said second end region of said cylinder, subsequently forming said deformation, to affix said piston rod guide and sealing unit to said container and forming an indentation in said container between said first and second axial end regions thereof, said indentation being made after said deformation has been formed.

14. A method according to claim 13 wherein said indentation is made by means of a roller which has a surface which is curved in the shape of a drum, which is rotatably supported about its axis and is aligned with its axis so as to be essentially parallel to the axis of said container, wherein said roller being pressed against said container in a radial direction while relative rotary motion between said container and said roller is simultaneously effected.

15. A method according to claim 14 wherein the generatrix for the outer surface of said roller is a circular arc, and wherein the radius of said circular arc corresponds at least to 1.5 times the axial length of said indentation.

16. A method according to claim 15 wherein said radius is at least twice said axial length.

17. A method according to claim 14 wherein said roller is pressed against said container by means of a pressing device with an adjustable pressing force.

18. A method according to claim 14 wherein said roller is pressed against said container by means of elastic force transmission means.

* * * * *